(12) United States Patent
Yamada

(10) Patent No.: US 10,657,840 B2
(45) Date of Patent: May 19, 2020

(54) IMAGE FORMING APPARATUS

(71) Applicant: KYOCERA Document Solutions Inc., Osaka (JP)

(72) Inventor: Sumio Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/957,355

(22) Filed: Apr. 19, 2018

(65) Prior Publication Data
US 2018/0308386 A1    Oct. 25, 2018

(30) Foreign Application Priority Data

Apr. 21, 2017 (JP) ................................. 2017-084328

(51) Int. Cl.
| | |
|---|---|
| *B41J 2/21* | (2006.01) |
| *G09B 19/00* | (2006.01) |
| *B41J 3/407* | (2006.01) |
| *C09D 11/38* | (2014.01) |
| *C09D 11/40* | (2014.01) |

(Continued)

(52) U.S. Cl.
CPC .......... *G09B 19/003* (2013.01); *B41J 2/2103* (2013.01); *B41J 2/2107* (2013.01); *B41J 3/407* (2013.01); *C09D 11/38* (2013.01); *C09D 11/40* (2013.01); *C09D 11/50* (2013.01); *A63H 33/16* (2013.01)

(58) Field of Classification Search
None
See application file for complete search history.

(56) References Cited

U.S. PATENT DOCUMENTS

| | | | | |
|---|---|---|---|---|
| 2005/0093948 A1* | 5/2005 | Morris | ................... | B41J 2/2114 347/100 |
| 2011/0310142 A1* | 12/2011 | Xu | ........................... | B41M 5/00 347/7 |

(Continued)

FOREIGN PATENT DOCUMENTS

| | | | | |
|---|---|---|---|---|
| JP | 07056378 | A | * | 3/1995 |
| JP | 3085035 | U | | 4/2002 |

(Continued)

OTHER PUBLICATIONS

An Office Action mailed by the Japanese Patent Office dated Nov. 19, 2019, which corresponds to Japanese Patent Application No. 2017-084328 and is related to U.S. Appl. No. 15/957,355.

*Primary Examiner* — Matthew Luu
*Assistant Examiner* — Tracey M McMillion
(74) *Attorney, Agent, or Firm* — Studebaker & Brackett PC

(57) ABSTRACT

An inkjet recording apparatus includes an image forming device and a controller. The image forming device includes a recording head unit and forms on paper a fold line image representing a fold line. The controller includes a first selection section. The first selection section selects formation of the fold line image in a "first manner" or a "second manner". In the "first manner", the fold line image is formed so as to become invisible after a first period elapses from a first time point at which the fold line image is formed on the paper. In the "second manner", the fold line image is formed so as not to become invisible even after a second period elapses from the first time point. The second period is longer than the first period.

9 Claims, 7 Drawing Sheets

(51) Int. Cl.
*C09D 11/50* (2014.01)
*A63H 33/16* (2006.01)

(56) References Cited

U.S. PATENT DOCUMENTS

| 2013/0067865 | A1* | 3/2013 | Maruo | B65B 11/00 |
| | | | | 53/461 |
| 2015/0239268 | A1* | 8/2015 | Fukui | C09D 11/101 |
| | | | | 347/9 |
| 2015/0375496 | A1* | 12/2015 | Taki | B41F 33/16 |
| | | | | 101/35 |
| 2016/0002480 | A1* | 1/2016 | Van Hameren | C09D 11/14 |
| | | | | 347/20 |

FOREIGN PATENT DOCUMENTS

| JP | 2008-110069 A | 5/2008 |
| JP | 2010-115852 A | 5/2010 |

* cited by examiner

IMAGE FORMING APPARATUS

INCORPORATION BY REFERENCE

The present application claims priority under 35 U.S.C. § 119 to Japanese Patent Application No. 2017-084328, filed on Apr. 21, 2017. The contents of this application are incorporated herein by reference in their entirety.

BACKGROUND

The present disclosure relates to an image forming apparatus.

A fold line image and a folding sequence image are printed on some origami paper. The fold line image indicates a to-be-folded position and a folding manner. The folding sequence image indicates sequential order of folding of a fold line. The fold line image is distinguished by color in a manner that fold lines that are to be simultaneously folded in the same folding manner are colored in the same color.

SUMMARY

An image forming apparatus according to the present disclosure includes an image forming device and a first selection section. The image forming device forms a fold line image representing a fold line on a recording medium. The first selection section selects formation of the fold line image in a manner that the fold line image becomes invisible after a first period elapses from a first time point or in a manner that the fold line image is not invisible even after a second period elapses from the first time point, the first time point being a time point at which the fold line image is formed on the recording medium. The fold line indicates a to-be-folded position and a folding orientation of the recording medium. The second period is longer than the first period. The image forming device forms the fold line image on the recording medium according to a selection result by the first selection section.

DETAILED DESCRIPTION

Figure 1:
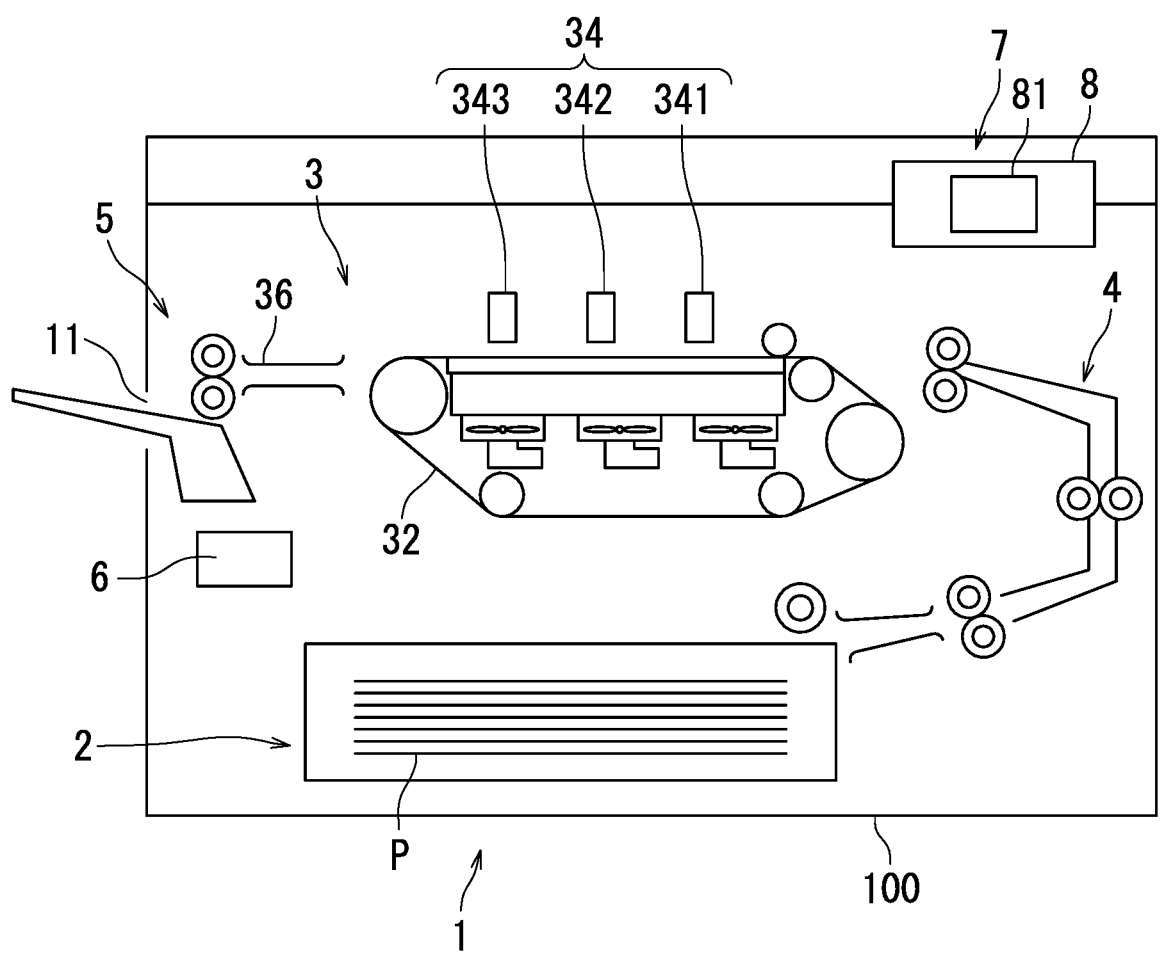
FIG. 1 is a diagram illustrating a configuration of an inkjet recording apparatus according to an embodiment.

An embodiment of the present disclosure will be described below with reference to the drawings (FIGS. 1 to 7). Elements that are the same or equivalent are indicated by the same reference signs in the drawings and explanation thereof is not repeated.

First of all, an inkjet recording apparatus 1 according to the present embodiment will be described with reference to FIGS. 1 and 2. FIG. 1 is a diagram illustrating a configuration of the inkjet recording apparatus 1. The inkjet recording apparatus 1 includes an apparatus casing 100, a feeding section 2, an image forming device 3, a conveyance path 4, an ejection section 5, a controller 6, an image scanner 7, and an operation display section 8. The inkjet recording apparatus 1 is an example of an "image forming apparatus".

The feeding section 2 is disposed in a lower part of the apparatus casing 100. The feeding section 2 feeds paper P to the conveyance path 4. The paper P is an example of a "recording medium".

The conveyance path 4 extends on one side (right side in FIG. 1) of the image forming device 3. The paper P is fed to the image forming device 3 through the conveyance path 4 with timing of image formation.

The image forming device 3 is disposed above the feeding section 2. The image forming device 3 forms an image on the paper P. The image forming device 3 includes a conveyor belt 32, a recording head unit 34, and a conveyance guide 36. The conveyor belt 32 conveys the paper P.

The ejection section 5 is disposed on an opposite side (left side in FIG. 1) of the image forming device 3. The ejection section 5 ejects the paper P out of the apparatus casing 100 through an exit port 11.

The controller 6 controls the inkjet recording apparatus 1. The controller 6 includes a processor and storage. The processor includes for example a central processing unit (CPU). The storage includes memory such as semiconductor memory and may include a hard disk drive (HDD). The storage stores control programs therein.

The image scanner 7 scans an image from an original document. The image scanner 7 includes an image scanning device. The image scanning device is a contact image sensor (CIS) unit including light emitting diodes (LEDs), contact glass, an imaging lens, and an image sensor that are united together.

The operation display section 8 includes a touch panel 81. The touch panel 81 includes for example a liquid crystal display (LCD) for displaying various images. The touch panel 81 further includes a touch sensor for receiving user operation.

Figure 2:
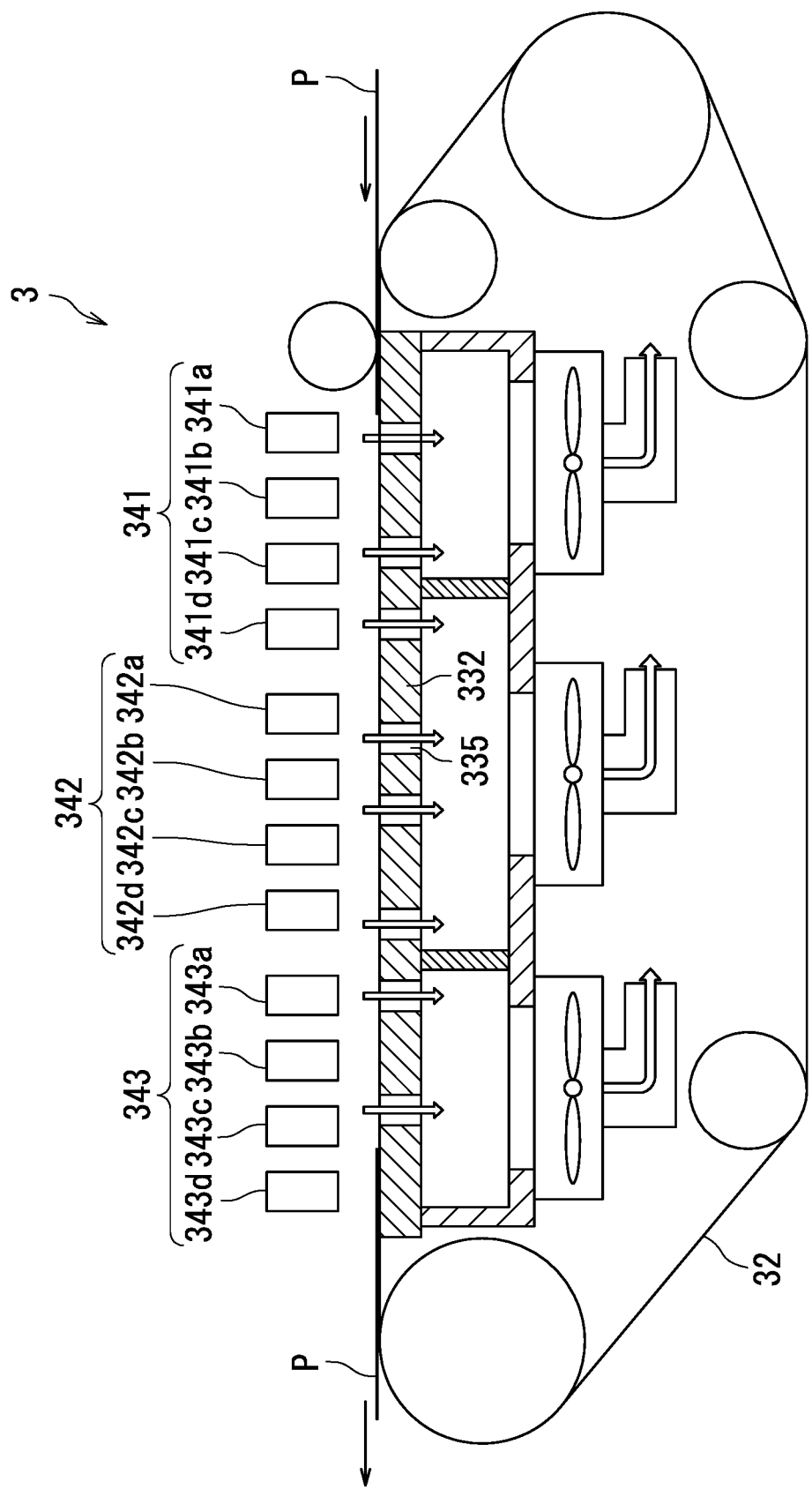
FIG. 2 is a diagram illustrating a configuration of an image forming device according to the embodiment.

The following further describes the inkjet recording apparatus 1 with reference to FIG. 2. FIG. 2 is a diagram illustrating a configuration of the image forming device 3 according to the present embodiment. As illustrated in FIG. 2, the recording head unit 34 forms an image on the paper P. The recording head unit 34 includes a first recording head 341, a second recording head 342, and a third recording head 343.

The first recording head 341 includes a cyan color first recording head 341a, a magenta color first recording head 341b, a yellow color first recording head 341c, and a black color first recording head 341d. The first recording heads 341a to 341d eject first inks K1 that are visible from a time point at which an image is formed on the paper P and that become invisible after a first period PD1 elapses from the time point at which the image is formed on the paper P. The first inks K1 include a cyan first ink K1c, a magenta first ink K1m, a yellow first ink K1y, and a black first ink K1k. The cyan color first recording head 341a accommodates the cyan first ink K1c and ejects the cyan first ink K1c. The magenta color first recording head 341b accommodates the magenta first ink K1m and ejects the magenta first ink K1m. The yellow color first recording head 341c accommodates the yellow first ink K1y and ejects the yellow first ink K1y. The black color first recording head 341d accommodates the black first ink K1k and ejects the black first ink K1k.

The second recording head 342 includes a cyan color second recording head 342a, a magenta color second recording head 342b, a yellow color second recording head 342c, and a black color second recording head 342d. The second recording heads 342a to 342d eject second inks K2 that are visible from the time point at which the image is formed on the paper P and that is not invisible even after a second period PD2 elapses from the time point at which the image is formed on the paper P. The second inks K2 include a cyan second ink K2c, a magenta second ink K2m, a yellow second ink K2y, and a black second ink K2k. Ordinary inks are used as the second inks K2. The second period PD2 is longer than the first period PD1. The cyan color second recording head 342a accommodates the cyan second ink K2c and ejects the cyan second ink K2c. The magenta color second recording head 342b accommodates the magenta second ink K2m and ejects the magenta second ink K2m. The yellow color second recording head 342c accommodates the yellow second ink K2y and ejects the yellow second ink K2y. The black color second recording head 342d accommodates the black second ink K2k and ejects the black second ink K2k.

The third recording head 343 includes a cyan color third recording head 343a, a magenta color third recording head 343b, a yellow color third recording head 343c, and a black color third recording head 343d. The third recording heads 343a to 343d eject third inks K3 that become visible after a fifth period PD5 elapses from the time point at which the image is formed on the paper P. The third inks K3 include a cyan third ink K3c, a magenta third ink K3m, a yellow third ink K3y, and a black third ink K3k. The fifth period PD5 is substantially equal in length to the first period PD1. The cyan color third recording head 343a accommodates the cyan third ink K3c and ejects the cyan third ink K3c. The magenta color third recording head 343b accommodates the magenta third ink K3m and ejects the magenta third ink K3m. The yellow color third recording head 343c accommodates the yellow third ink K3y and ejects the yellow third ink K3y. The black color third recording head 343d accommodates the black third ink K3k and ejects the black third ink K3k.

The first inks K1 and the third inks K3 each contain for example a decoloring agent. When cyclodextrin that is a clathrate compound is contained in the first inks K1 and the third inks K3 as the decoloring agent, the first inks K1 and the third inks K3 can be made invisible. The first inks K1 and the third inks K3, each of which contains the decoloring agent, are capable of being made visible and invisible.

Preferable examples of decoloring agents that can be used include α-cyclodextrin, β-cyclodextrin, and γ-cyclodextrin hydroxypropyl-β-cyclodextrin. As a result of at least one of component change and amount adjustment of the decoloring agent, length of the first and fifth periods PD1 and PD5 can be adjusted as desired.

Figure 3:
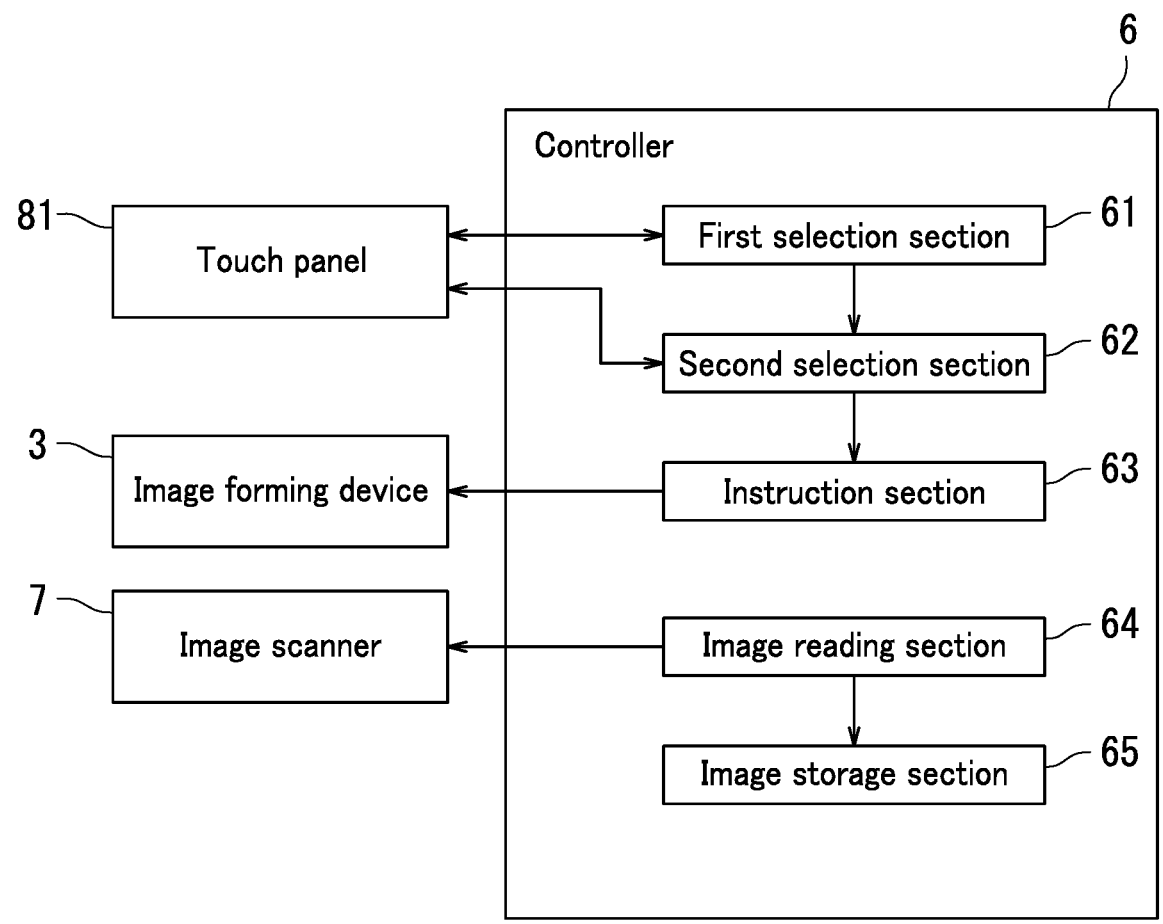
FIG. 3 is a diagram illustrating a configuration of a controller according to the embodiment.

The following describes a configuration of the controller 6 according to the present embodiment with reference to FIGS. 1 to 3. FIG. 3 is a diagram illustrating the configuration of the controller 6. As illustrated in FIG. 3, the controller 6 includes a first selection section 61, a second selection section 62, an instruction section 63, an image reading section 64, and an image storage section 65. Specifically, the processor functions as the first selection section 61, the second selection section 62, the instruction section 63, the image reading section 64, and the image storage section 65 through execution of the control programs.

The first selection section 61 selects formation of a fold line image M1 in a "first manner" or in a "second manner" according to user operation on the touch panel 81. The fold line image M1 represents a fold line of origami paper in the present embodiment. The "fold line" indicates a "to-be-folded position" and a "folding orientation" of the paper P. The "folding orientation" represents a mountain fold or a valley fold. For example, the mountain fold is indicated by a broken line while the valley fold is indicated by a solid line. In the "first manner", the fold line image M1 is formed so as to become invisible after the first period PD1 elapses from a first time point at which the fold line image M1 is formed on the paper P. In the "second manner", the fold line image M1 is formed so as not to become invisible even after the second period PD2 elapses from the first time point. The second period PD2 is longer in length than the first period PD1. Specifically, the fold line image M1 is formed on the paper P using the first recording head 341 in the first manner. The fold line image M1 is formed on the paper P using the second recording head 342 in the second manner.

The first selection section 61 further selects formation of a folding sequence image M2 in a "third manner" or in a "fourth manner" according to user operation on the touch panel 81. The "folding sequence" indicates sequential order of folding of the paper P. The "third manner" and the "fourth manner" will be described later in detail with reference to FIGS. 4A and 4B.

The second selection section 62 selects formation of a pattern image M3 in a "fifth manner" or in a "sixth manner" according to user operation on the touch panel 81. A "pattern" is to be formed on the paper P for enhancing aesthetic appearance of the paper P. The "fifth manner" and the "sixth manner" will be described later in detail with reference to FIGS. 4A and 4B.

The instruction section 63 forms the fold line image M1 and the folding sequence image M2 on the paper P according to selection results by the first selection section 61. The instruction section 63 also forms the pattern image M3 on the paper P according to a selection result by the second selection section 62. Specifically, the instruction section 63 instructs the image forming device 3 to form the fold line image M1, the folding sequence image M2, and the pattern image M3 on the paper P.

The instruction section 63 instructs the image forming device 3 to switch between the first recording head 341 and the second recording head 342 according to the selection results by the first selection section 61. The instruction section 63 further instructs the image forming device 3 to switch between the second recording head 342 and the third recording head 343 according to the selection result by the second selection section 62.

The image reading section 64 reads an image M4 from origami paper. Specifically, the image reading section 64 reads the image M4 of the origami paper each time the origami paper is unfolded along a fold line starting from a state in which folding of the origami paper is finished.

The image storage section 65 stores information indicating the image M4 of the origami paper in association with information indicating the number N of times of unfolding.

As described with reference to FIGS. 1 to 3, the image forming device 3 forms the fold line image M1 representing a fold line on the paper P in the present embodiment. Through selection of formation of the fold line image M1 in the first manner, the fold line image M1 can be made invisible after the first period PD1 elapses from the time point at which the fold line image M1 is formed. As a result, a situation in which the fold line image M1 remains on a finished article of the origami paper can be prevented.

The image forming device 3 switches between the first recording head 341 and the second recording head 342 according to the selection results by the first selection section 61. The first inks K1 ejected from the first recording head 341 become invisible after the first period PD1 elapses. The second inks K2 ejected from the second recording head 342 are not invisible even after the second period PD2 elapses. In the above configuration, formation of the fold line image M1 using the first recording head 341 can make the fold line image M1 invisible after the first period PD1 elapses.

The following further describes the configuration of the controller 6 according to the present embodiment with reference to FIGS. 1 to 5B. FIGS. 4A and 4B each illustrate a fold line image M1 and a folding sequence image M2 for folding a paper airplane in a squid-like shape as an example of origami. FIG. 4A is a diagram illustrating respective examples of the fold line image M1 and the folding sequence image M2 formed on an upper surface 900 of origami paper. FIG. 4B is a diagram illustrating respective examples of the fold line image M1, the folding sequence image M2, and the pattern image M3 formed on a lower surface 910 of the origami paper. As illustrated in FIG. 4A, a fold line image 901, a fold line image 903, a fold line image 905, and a fold line image 906 each included in the fold line image M1 are formed on the upper surface 900 of the origami paper. The fold line images 901, 903, 905, and 906 each represent a valley fold. A folding sequence image 911, a folding sequence image 913, a folding sequence image 915, and a folding sequence image 916 each included in the folding sequence image M2 are formed on the upper surface 900 of the origami paper. The folding sequence images 911, 913, 915, and 916 indicate sequential order of folding along the fold lines represented by the fold line images 901, 903, 905, and 906, respectively.

Figure 4A:
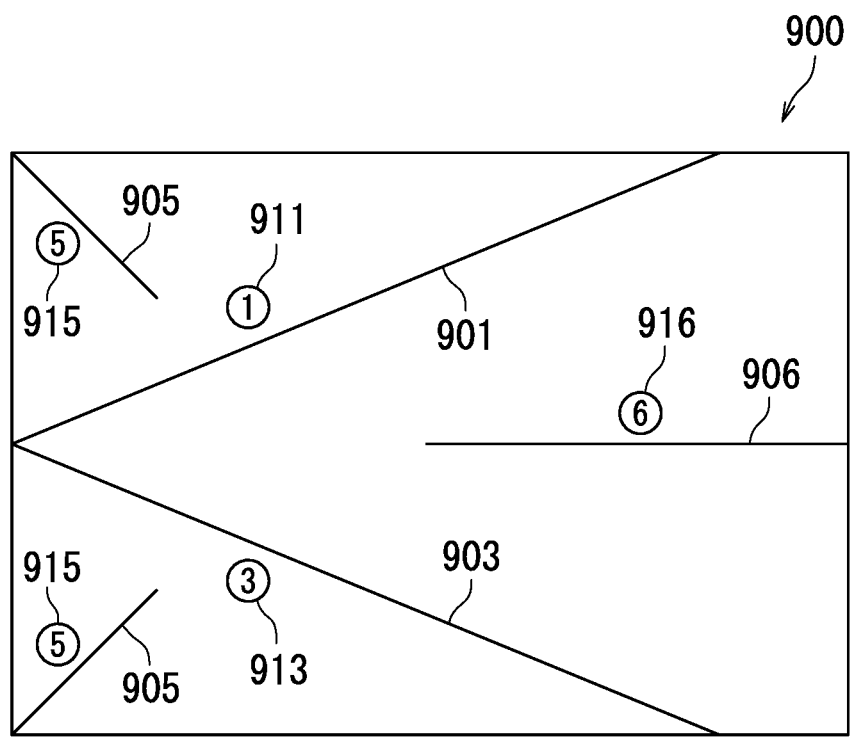
FIG. 4A is a diagram illustrating an example of a fold line image and a folding sequence image formed on an upper surface of origami paper.
Figure 4B:
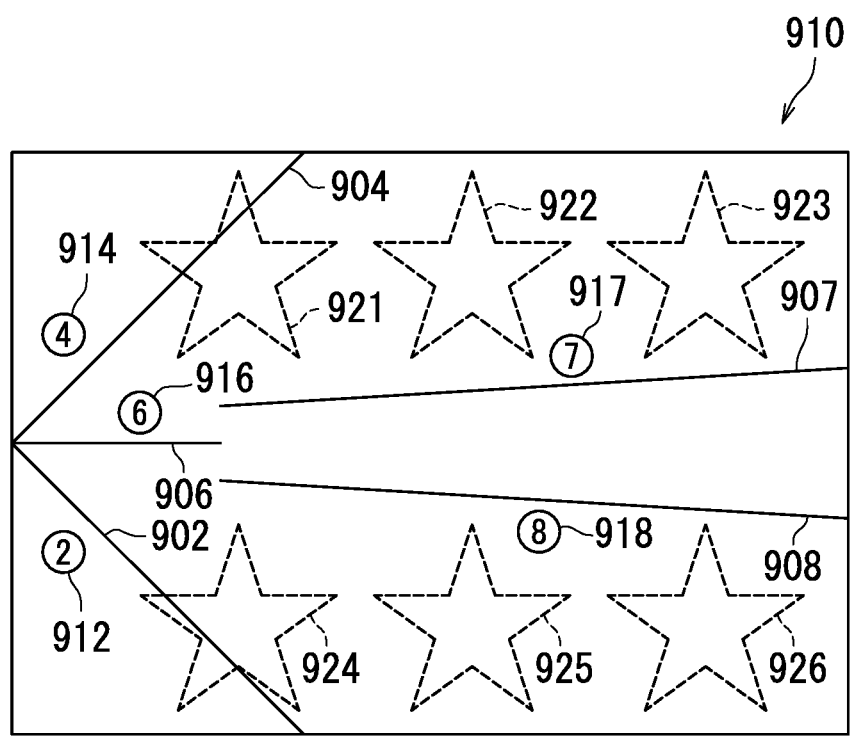
FIG. 4B is a diagram illustrating an example of a fold line image, a folding sequence image, and a pattern image formed on a lower surface of the origami paper.

As illustrated in FIG. 4B, a fold line image 902, a fold line image 904, a fold line image 906, a fold line image 907, and a fold line image 908 each included in the fold line image M1 are formed on the lower surface 910 of the origami paper. The fold line images 902, 904, 906, 907, and 908 each represent a valley fold. A folding sequence image 912, a folding sequence image 914, a folding sequence image 916, a folding sequence image 917, and a folding sequence image 918 each included in the folding sequence image M2 are formed on the lower surface 910 of the origami paper. The folding sequence images 912, 914, 916, 917, and 918 indicate sequential order of folding along the fold lines represented by the fold line images 902, 904, 906, 907, and 908, respectively. A pattern image 921, a pattern image 922, a pattern image 923, a pattern image 924, a pattern image 925, and a pattern image 926 each included in the pattern image M3 are formed on the lower surface 910 of the origami paper. The pattern images 921 to 926 are not visible at a time point at which the pattern images 921 to 926 are formed on the paper P, and therefore, are indicated by broken lines.

The pattern image 921 crosses the fold line image 904. The pattern image 924 crosses the fold line image 902. In the above configuration, the fold line images 904 and 902 are hard to see in a situation in which the pattern images 921 and 924 are formed. By contrast, when the second selection section 62 selects formation of the pattern image M3 in the "fifth manner", the pattern image M3 can be formed so as to become visible after the fifth period PD5 elapses from a third time point at which the pattern image M3 is formed in the present embodiment, as will be described later. As a result, a situation in which the fold line images 904 and 902 are hard to see in the presence of the pattern images 921 and 924 can be prevented.

The first selection section 61 selects formation of the folding sequence image M2 in the "third manner" or in the "fourth manner". In the "third manner", the folding sequence image M2 is formed so as to become invisible after a third period PD3 elapses from a second time point at which the folding sequence image M2 is formed on paper P. In the "fourth manner", the folding sequence image M2 is formed so as not to become invisible even after a fourth period PD4 elapses from the second time point. The fourth period PD4 is longer than the third period PD3. In the present embodiment, the third period PD3 is equal in length to the first period PD1 and the fourth period PD4 is equal in length to the second period PD2. Specifically, the folding sequence image M2 is formed on the paper P using the first recording head 341 in the "third manner". The folding sequence image M2 is formed on the paper P using the second recording head 342 in the "fourth manner".

The second selection section 62 selects formation of the pattern image M3 in the "fifth manner" or in the "sixth manner". In the "fifth manner", the pattern image M3 is formed so as to become visible after the fifth period PD5 elapses from the third time point at which the pattern image M3 is formed on the paper P. In the "sixth manner", the pattern image M3 is formed so as to be visible at the third time point. Specifically, the pattern image M3 is formed on the paper P using the third recording head 343 in the "fifth manner". The pattern image M3 is formed on the paper P using the second recording head 342 in the "sixth manner".

The instruction section 63 instructs the image forming device 3 to switch among the first recording head 341, the second recording head 342, and the third recording head 343 according to the selection results by the first and second selection sections 61 and 62.

Figure 5A:
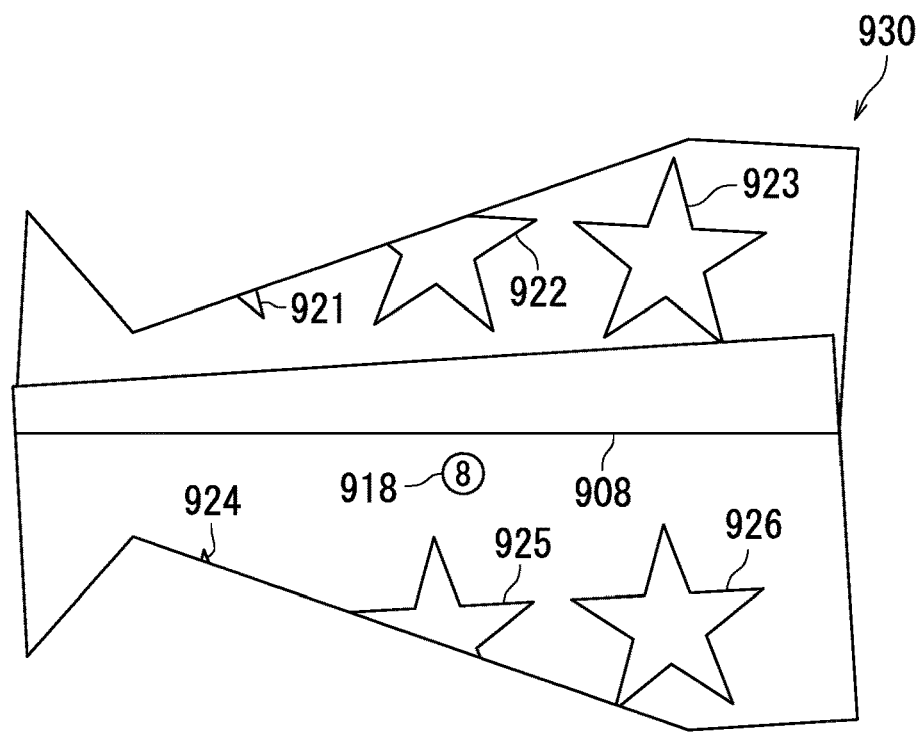
FIG. 5A is a perspective view illustrating an example of a finished article.
Figure 5B:
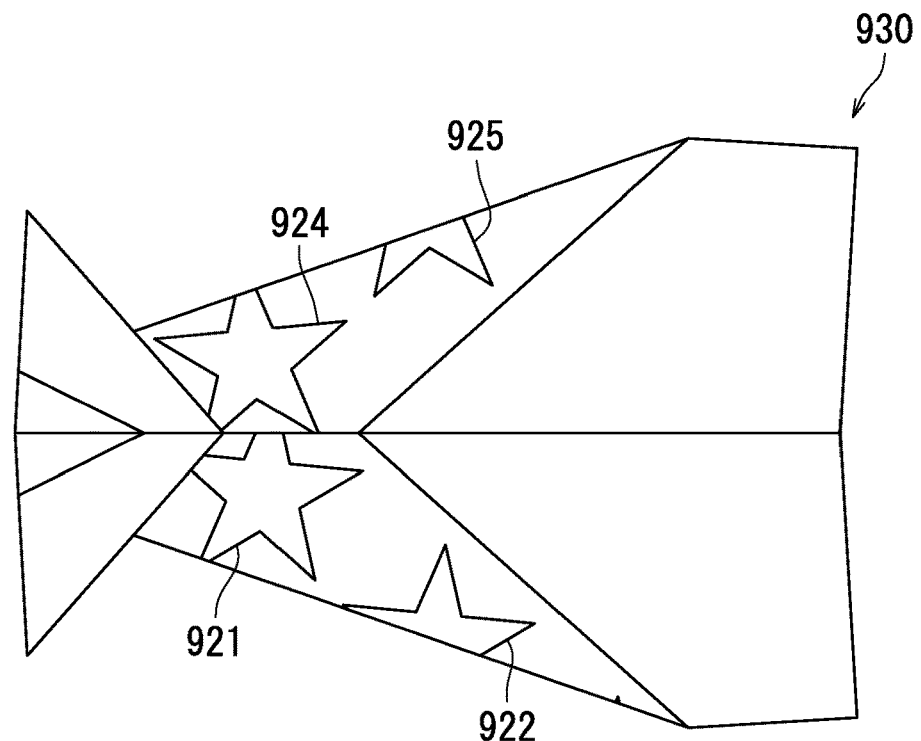
FIG. 5B is a top view illustrating the example of the finished article.

FIG. 5A is a lower perspective view illustrating an example of a finished article 930. FIG. 5B is a top view illustrating the example of the finished article 930.

As illustrated in FIGS. 5A and 5B, the pattern images 921, 922, 923, 924, 925, and 926 each included in the pattern image M3 are formed on the finished article 930. The pattern image M3 become visible after the fifth period PD5 elapses from the third time point at which the pattern image M3 is formed on paper P. Therefore, the pattern images 921 to 926 are indicated by solid lines.

Neither the fold line image M1 nor the folding sequence image M2 is seen in the top view of the finished article 930 as illustrated in FIG. 5B, while the fold line image 908 and the folding sequence image 918 are seen in the lower perspective view of the finished article 930 as illustrated in FIG. 5A. As such, the finished article 930 on which the fold line image M1 or the folding sequence image M2 remains is not so good in appearance. However, when the first selection section 61 selects formation of the fold line image M1 in the "first manner", the fold line image M1 can be formed so as to become invisible after the first period PD1 elapses from the first time point. Also, when formation of the folding sequence image M2 in the "third manner" is selected, the folding sequence image M2 can be formed so as to become invisible after the third period PD3 elapses from the second time point. In the above configuration, the fold line image M1 and the folding sequence image M2 do not remain on the finished article 930, resulting in enhancement in appearance of the finished article 930.

As described with reference to FIGS. 1 to 5B, the image forming device 3 forms the folding sequence image M2 representing sequential order of folding of the paper P in the present embodiment. Upon selection of formation of the folding sequence image M2 that becomes invisible after the third period PD3 elapses from the second time point at which the folding sequence image M2 is formed on the paper P, the folding sequence image M2 can be made invisible after the third period PD3 elapses. As a result, a situation in which the folding sequence image M2 remains on the finished article 930 of the origami paper can be prevented.

The first inks K1 ejected from the first recording head 341 become invisible after the first period PD1 elapses. In the above configuration, formation of the folding sequence image M2 using the first recording head 341 can result in the folding sequence image M2 becoming invisible after the first period PD1 elapses.

Upon selection of formation of the pattern image M3 that become visible after the fifth period PD5 elapses from the third time point at which the pattern image M3 is formed on the paper P, the pattern image M3 can be made visible after the fifth period PD5 elapses. When the fifth period PD5 is set to be equal to or longer than a time period necessary for folding (e.g., ten minutes), the pattern image M3 is not visible during folding. As such, a situation in which the pattern image M3 become visible in folding to hide the fold line image M1 or the folding sequence image M2 can be prevented. Furthermore, the pattern image M3, which becomes visible after the fifth period PD5 elapses, can provide surprise and pleasure to a user.

The third inks K3 ejected from the third recording head 343 become visible after the fifth period PD5 elapses. As such, formation of the pattern image M3 using the third recording head 343 can make the pattern image M3 visible after the fifth period PD5 elapses.

Figure 6:
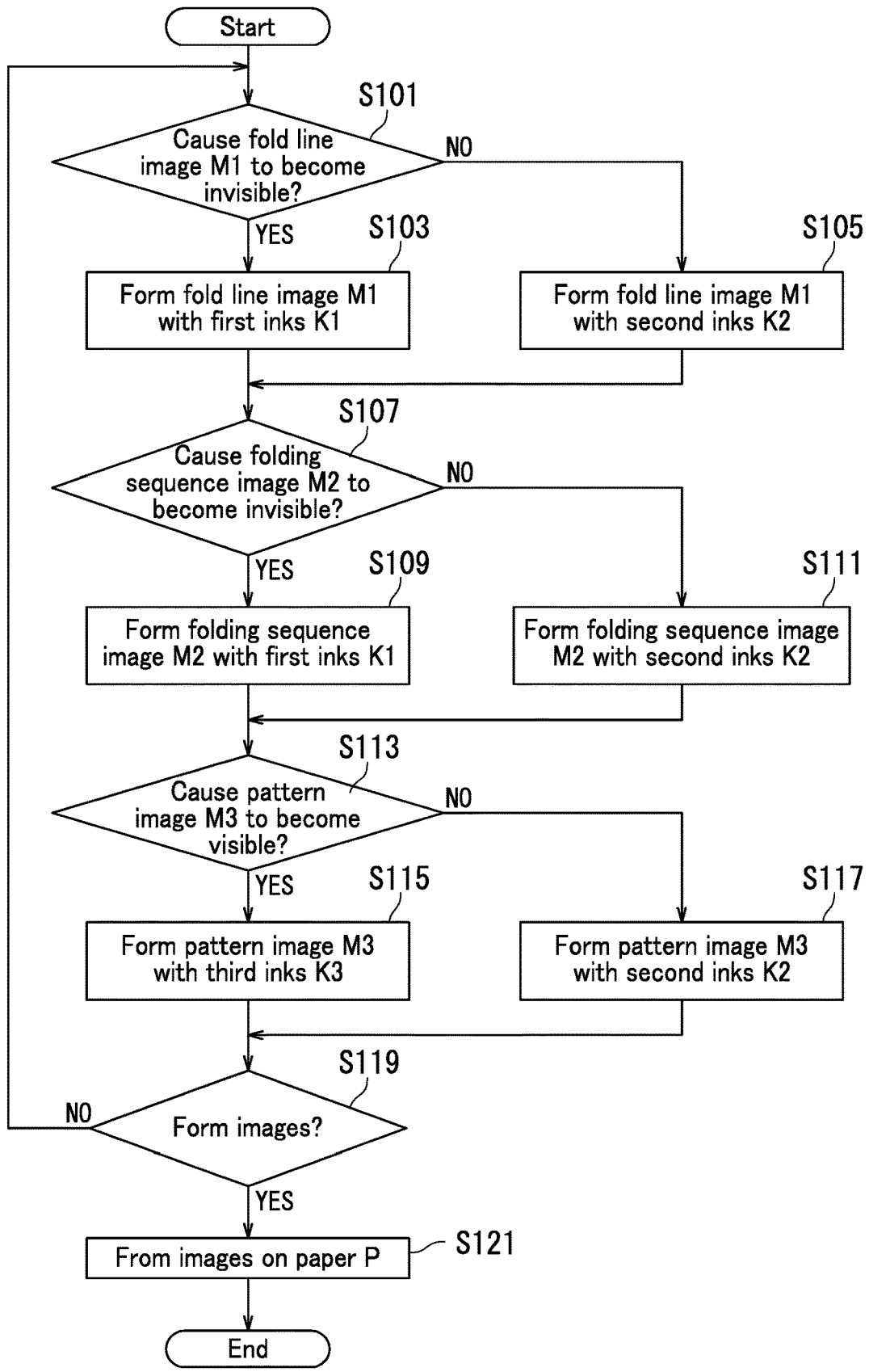
FIG. 6 is a flowchart depicting processing that the controller performs.

The following describes processing that the controller 6 performs with reference to FIGS. 1 to 6. FIG. 6 is a flowchart depicting the processing that the controller 6 performs.

First at Step S101, the first selection section 61 selects, according to user operation on the touch panel 81, formation of a fold line image M1 in a manner that the fold line image M1 becomes invisible after elapse of the first period PD1 from the first time point at which the fold line image M1 is formed on paper P or in a manner that the fold line image M1 is not to be invisible thereafter.

When the first selection section 61 selects formation of the fold line image M1 in a manner that the fold line image M1 becomes invisible after elapse of the first period PD1 (NO at Step S101: for example, when formation in the second manner is selected), the processing proceeds to Step S105. When the first selection section 61 selects formation of the fold line image M1 in a manner that the fold line image M1 becomes invisible after elapse of the first period PD1 (YES at Step S101: for example, when formation in the first manner is selected), the processing proceeds to Step S103.

At Step S103, the first selection section 61 selects formation of the fold line image M1 with the first inks K1 and the processing proceeds to Step S107.

When a negative determination is made at Step S101, the first selection section 61 selects formation of the fold line image M1 with the second inks K2 at Step S105 and the processing proceeds to Step S107.

At Step S107, the first selection section 61 selects, according to user operation on the touch panel 81, formation of a folding sequence image M2 in a manner that the folding sequence image M12 becomes invisible after elapse of the third period PD3 from the second time point at which the folding sequence image M2 is formed on the paper P or in a manner that the folding sequence image M2 is not to be invisible thereafter.

When the first selection section 61 selects formation of the folding sequence image M2 in a manner that the folding sequence image M2 becomes invisible after elapse of the third period PD3 (NO at Step S107: for example, when formation in the fourth manner is selected), the processing proceeds to Step S111. When the first selection section 61 selects formation of the folding sequence image M2 in a manner that the folding sequence image M2 becomes invisible after elapse of the third period PD3 (YES at Step S107: for example, when formation in the third manner is selected), the processing proceeds to Step S109.

At Step S109, the first selection section 61 selects formation of the folding sequence image M2 with the first inks K1 and the processing proceeds to Step S113.

When a negative determination is made at Step S107, the first selection section 61 selects formation of the folding sequence image M2 with the second inks K2 at Step S111 and the processing proceeds to Step S113.

At Step S113, the second selection section 62 selects, according to user operation on the touch panel 81, formation of a pattern image M3 in a manner that the pattern image M3 becomes visible after elapse of the fifth period PD5 from the third time point at which the pattern image M3 is formed on the paper P or in a manner that the pattern image M3 is visible at the third time point.

When the second selection section 62 selects formation of the pattern image M3 in a manner that the pattern image M3 is visible at the third time point, that is, in a manner that the pattern image M3 is visible for example from the beginning (NO ate Step S113: for example, when formation in the sixth manner is selected), the processing proceeds to Step S117. When the second selection section 62 selects formation of the pattern image M3 in a manner that the pattern image M3 becomes visible after elapse of the fifth period PD5 (YES at Step S113: for example, when formation in the fifth manner is selected), the processing proceeds to Step S115.

At Step S115, the second selection section 62 selects formation of the pattern image M3 with the third inks K3 and the processing proceeds to Step S119.

When a negative determination is made at Step S113, the second selection section 62 selects formation of the pattern image M3 with the second inks K2 at Step S117 and the processing proceeds to Step S119.

At Step S119, the instruction section 63 determines whether or not the fold line image M1, the folding sequence image M2, and the pattern image M3 are to be formed on the paper P based on user operation on the touch panel 81.

When the instruction section 63 determines that the fold line image M1, the folding sequence image M2, and the pattern image M3 are not to be formed on the paper P (NO at Step S119), the processing returns to Step S101. When the instruction section 63 determines that the fold line image M1, the folding sequence image M2, and the pattern image M3 are to be formed on the paper P (YES at Step S119), the processing proceeds to Step S121.

At Step S121, the instruction section 63 instructs the image forming device 3 to form the fold line image M1, the folding sequence image M2, and the pattern image M3 on the paper P and the processing ends.

As described above with reference to FIGS. 1 to 6, the instruction section 63 performs switching among the first recording head 341, the second recording head 342, and the third recording head 343 according to the respective selection results by the first and second selection sections 61 and 62 in the present embodiment. The first inks K1 ejected from the first recording head 341 become invisible after elapse of the first period PD1. The second inks K2 ejected from the second recording head 342 are visible from the time point of image formation, and is not invisible even after elapse of the second period PD2. The third inks K3 ejected from the third recording head 343 become visible after elapse of the fifth period PD5.

In the above configuration, image formation on the paper P can be done so that the fold line image M1 becomes invisible after elapse of the first period PD1, the folding sequence image M2 becomes invisible after elapse of the third period PD3, and the pattern image M3 becomes visible after elapse of the fifth period PD5.

Figure 7:
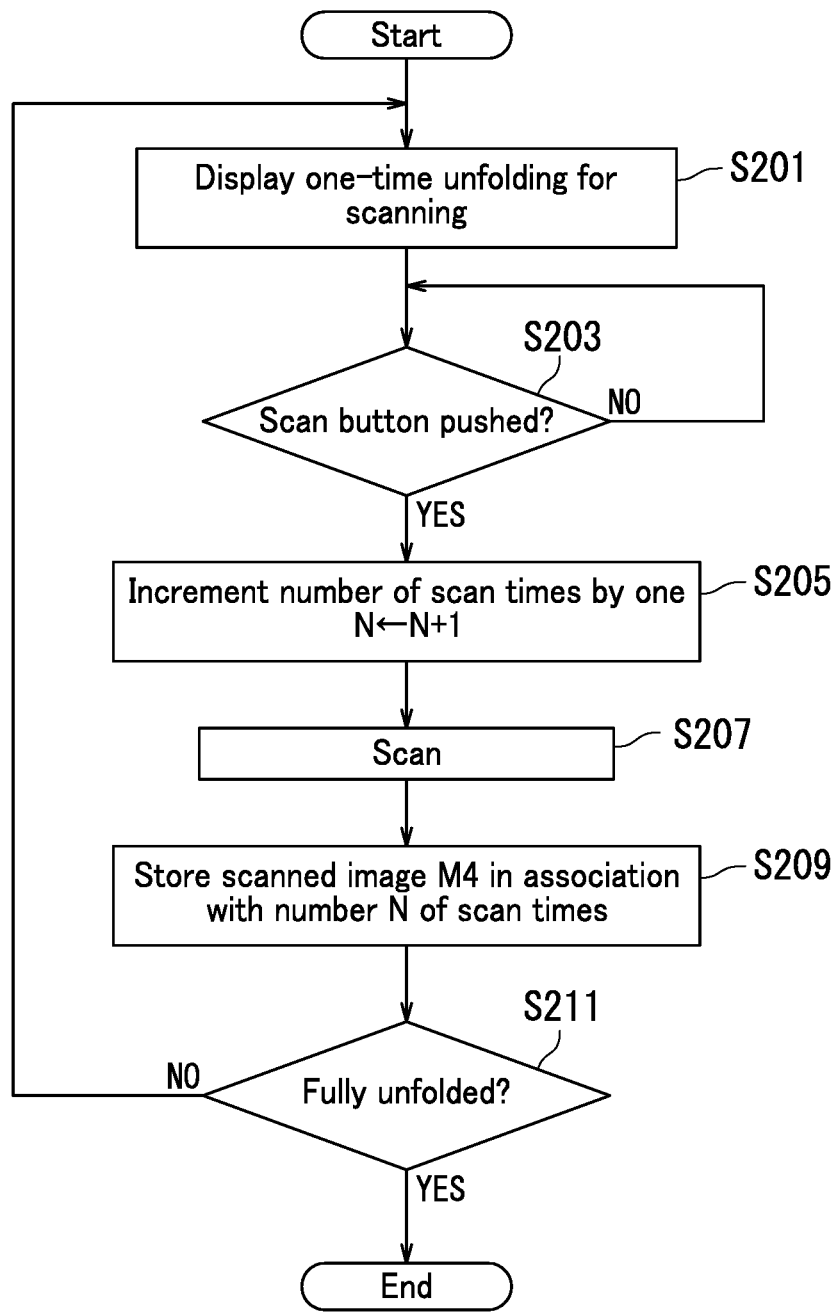
FIG. 7 is a flowchart depicting processing that the controller performs other than that depicted in FIG. 6.

The following further describes processing that the controller 6 performs with reference to FIGS. 1 to 7. The processing in the flowchart of FIG. 7 is processing that the controller 6 performs other than that depicted in FIG. 6. Note that origami paper is initially in a state in which folding of the origami paper is finished. Also, the number N of scan times is set at 0 (zero) initially.

First at Step S201, the image reading section 64 causes the touch panel 81 to display unfolding along a fold line for scanning. Specifically, the image reading section 64 causes the touch panel 81 to display a message "please unfold along a fold line and scan", for example.

Subsequently, the image reading section 64 determines at Step S203 whether or not a scan button is pushed. The "scan button" is disposed on the operation display section 8. The user pushes the "scan button" to instruct the image scanner 7 to scan an image.

When the image reading section 64 determines that the scan button is not pushed (NO at Step S203), the processing is put on standby. When the image reading section 64 determines that the scan button is pushed (YES at Step S203), the processing proceeds to Step S205.

At Step S205, the image reading section 64 increments the number N of scan times by one.

Subsequently, the image reading section 64 causes scanning at Step S207. Specifically, the image reading section 64 causes the image scanner 7 to scan an image of the origami paper and generates an image M4 of the origami paper.

The image reading section 64 then stores into the image storage section 65 information indicating the image M4 of the origami paper in association with information indicating the number N of scan times.

Next, the image reading section 64 determines whether or not the origami paper is unfolded along all fold lines based on user operation on the touch panel 81.

When the image reading section 64 determines that the origami paper is not unfolded along all the fold lines (NO at Step S211), the processing returns to Step S201. When the image reading section 64 determines that the origami paper is unfolded along all the fold lines (YES at Step S211), the processing ends.

As described with reference to FIGS. 1 to 7, the image reading section 64 reads the image M4 of the origami paper each time the origami paper is unfolded along a fold line starting from a state in which folding of the origami paper is finished in the present embodiment. The image storage section 65 stores information indicating the image M4 of the origami paper in association with the information indicating the number N of times of unfolding. The number N of times of unfolding corresponds to the number N of scan times. In the above configuration in which the information indicating the image M4 of the origami paper is stored in association with the information indicating the number N of times of unfolding, data indicating a folding manner of the origami paper can be stored.

An embodiment of the present disclosure has been described so far with reference to the drawings. However, the present disclosure is not limited to the above-described embodiment and can be practiced in various ways without departing from the scope of the gist of the present disclosure (for example, (1) to (5) described below). The drawings are schematic illustrations that emphasize elements of configuration in order to facilitate understanding thereof. Therefore, in order that elements of configuration can be easily illustrated, dimensions such as thickness and length and the number of each of the elements of configuration in the drawings may differ from the actual dimensions and the number thereof. The shape, the dimensions, and so on of each elements of configuration shown in the above-described embodiment are merely examples that do not impose any particular limitations and can be altered in various ways to the extent that there is not substantial deviation from the configuration of the present disclosure.

(1) As described with reference to FIGS. 1 and 2, the image forming apparatus is the inkjet recording apparatus 1 in the present disclosure, which however should not be taken to limit the present disclosure. It is only required that the image forming apparatus is capable of forming images on recording mediums. For example, the image forming apparatus may be an electrographic image forming apparatus that forms images on recording mediums. In the above configuration, the decoloring agent is added to toner.

(2) As described with reference to FIGS. 1 and 2, the recording head unit 34 includes the first recording head 341, the second recording head 342, and the third recording head 343 in the present embodiment, which however should not be taken to limit the present disclosure. It is only required that the recording head unit 34 is capable of switching at least between the first inks K1 and the second inks K2. For example, the recording head unit 34 may include an ink cartridge accommodating the first inks K1 and an ink cartridge accommodating the second inks K2 each of which is attachable to and detachable from the recording head unit 34.

(3) As described with reference to FIGS. 1 and 2, the recording head unit 34 includes the first recording head 341, the second recording head 342, and the third recording head 343 in the present embodiment, which however should not be taken to limit the present disclosure. It is only required that the recording head unit 34 is capable of switching at least between the second inks K2 and the third inks K3. For example, the recording head unit 34 may include an ink cartridge accommodating the second inks K2 and an ink cartridge accommodating the third inks K3 each of which is attachable to and detachable from the recording head unit 34.

(4) As described with reference to FIGS. 1 and 2, the first recording head 341 includes the first recording heads 341*a* to 341*d*, which however should not be taken to limit the present disclosure. It is only required that the first recording head 341 includes at least one recording head. For example, the first recording head 341 may include only one recording head. Alternatively, the first recording head 341 may for example include five or more recording heads. Likewise, it is only required that the second recording head 342 and the third recording head 343 each include at least one recording head.

(5) As described with reference to FIGS. 1 to 7, the fold line image M1, the folding sequence image M2, and the pattern image M3 are formed on the origami paper in the present embodiment, which however should not be taken to limit the present disclosure. It is only required that at least the fold line image M1 is formed on origami paper or wrapping paper. For example, it is possible that only the fold line image M1 and the pattern image M3 are formed on the wrapping paper.

What is claimed is:

1. An image forming apparatus comprising:
    an image forming device configured to form a fold line image, a pattern image, and a folding sequence image on a recording medium, the fold line image representing a fold line, the pattern image representing a pattern, the folding sequence image representing a folding sequence;
    a first selection section configured to select one of a first manner and a second manner in formation of the fold line image and select one of a third manner and a fourth manner in formation of the folding sequence image;
    a second selection section configured to select one of a fifth manner and a sixth manner in formation of the pattern image;
    a first recording head configured to eject a first ink;
    a second recording head configured to eject a second ink; and
    a third recording head configured to eject a third ink, wherein
    the first ink becomes invisible when a first period elapses, the first period corresponding to a period for folding the recording medium,
    the second ink remains visible for a second period or longer, the second period being longer than the first period,
    the third ink is invisible at image formation on the recording medium with the third ink, and becomes visible when the first period elapses,
    the fold line represents a to-be-folded position and a folding orientation of the recording medium,
    the folding sequence indicates sequential order of folding of the recording medium,
    the first manner is a manner in which the fold line image becomes invisible when the first period elapses from a first time point at which the fold line image is formed on the recording medium,
    the second manner is a manner in which the fold line image remains visible for the second period or longer from the first time point,
    the third manner is a manner in which the folding sequence image becomes invisible when the first period elapses from a second time point at which the folding sequence image is formed on the recording medium,
    the fourth manner is a manner in which the folding sequence image remains visible for the second period or longer from the second time point,
    the fifth manner is a manner in which the pattern image becomes visible when the first period elapses from a third time point at which the pattern image is formed on the recording medium,
    the sixth manner is a manner in which the pattern image becomes visible at the third time point,
    the image forming device forms the fold line image and the folding sequence image on the recording medium through switching between the first recording head and the second recording head according to a selection result by the first selection section, and
    the pattern image is formed on the recording medium through switching between the second recording head and the third recording head according to a selection result by the second selection section.

2. The image forming apparatus according to claim 1, wherein
    the fold line image represents the fold line of origami paper or wrapping paper that is the recording medium, and
    the image forming device forms the fold line image on the recording medium.

3. The image forming apparatus according to claim 2, further comprising:
    an image reading section configured to read an image of the origami paper or the wrapping paper; and
    an image storage section that stores the image of the origami paper or the wrapping paper in association with a number of times of unfolding, wherein
    the image reading section reads the image of the origami paper or the wrapping paper each time the origami paper or the wrapping paper is unfolded along a fold line starting from a state in which folding of the origami paper or the wrapping paper is finished.

4. The image forming apparatus according to claim 1, wherein
    the fold line includes a fold line representing a mountain fold as the folding orientation or a fold line representing a valley fold as the folding orientation, and
    the fold line representing the mountain fold is different in line type from the fold line representing the valley fold.

5. The image forming apparatus according to claim 1, wherein
    the first ink contains a decoloring agent, and
    the decoloring agent contains at least one of α-cyclodextrin, β-cyclodextrin, and γ-cyclodextrin hydroxypropyl-β-cyclodextrin.

6. The image forming apparatus according to claim 5, wherein
    at least one of component change and amount adjustment of the decoloring agent is performed based on a length of the first period.

7. The image forming apparatus according to claim 1, wherein
    the first ink includes a cyan first ink, a magenta first ink, a yellow first ink, and a black first ink,
    the first recording head includes:
        a recording head that ejects the cyan first ink;
        a recording head that ejects the magenta first ink;
        a recording head that ejects the yellow first ink; and
        a recording head that ejects the black first ink,
    the second ink includes a cyan second ink, a magenta second ink, a yellow second ink, and a black second ink,
    the second recording head includes:
        a recording head that ejects the cyan second ink;
        a recording head that ejects the magenta second ink;
        a recording head that ejects the yellow second ink; and
        a recording head that ejects the black second ink,
    the third ink includes a cyan third ink, a magenta third ink, a yellow third ink, and a black third ink, and the third recording head includes:
- a recording head that ejects the cyan third ink;
- a recording head that ejects the magenta third ink;
- a recording head that ejects the yellow third ink; and
- a recording head that ejects the black third ink.

8. The image forming apparatus according to claim 1, wherein
the third ink contains a decoloring agent, and
the decoloring agent contains at least one of α-cyclodextrin, β-cyclodextrin, and γ-cyclodextrin hydroxypropyl-β-cyclodextrin.

9. The image forming apparatus according to claim 8, wherein
at least one of component change and amount adjustment of the decoloring agent is performed based on a length of the first period.

* * * * *